United States Patent
Gjerdrum et al.

(10) Patent No.: US 11,928,120 B2
(45) Date of Patent: Mar. 12, 2024

(54) DISTRIBUTED DATA QUERY UNDER DATA FLOW LIMITATIONS

(71) Applicant: Microsoft Technology Licensing, LLC, Redmond, WA (US)

(72) Inventors: Anders Tungeland Gjerdrum, Tromso (NO); Tor Kreutzer, Tromso (NO); Jan-Ove Karlberg, Tromso (NO)

(73) Assignee: Microsoft Technology, LLC., Redmond, WA (US)

( * ) Notice: Subject to any disclaimer, the term of this patent is extended or adjusted under 35 U.S.C. 154(b) by 0 days.

(21) Appl. No.: 17/828,879

(22) Filed: May 31, 2022

(65) Prior Publication Data

US 2023/0385293 A1     Nov. 30, 2023

(51) Int. Cl.
*G06F 16/2458*     (2019.01)
*G06F 16/2455*     (2019.01)
*G06F 16/25*         (2019.01)
*G06F 16/28*         (2019.01)

(52) U.S. Cl.
CPC .... *G06F 16/2471* (2019.01); *G06F 16/24553* (2019.01); *G06F 16/256* (2019.01); *G06F 16/284* (2019.01)

(58) Field of Classification Search
CPC ................ G06F 16/284; G06F 16/256; G06F 16/245536; G06F 16/2471
See application file for complete search history.

(56) References Cited

U.S. PATENT DOCUMENTS

| | | | |
|---|---|---|---|
| 6,665,863 B1 | 12/2003 | Lord et al. | |
| 7,409,385 B2 | 8/2008 | Lindsay et al. | |
| 9,996,567 B2 | 6/2018 | Smart | |
| 11,537,613 B1* | 12/2022 | Cruanes | G06F 16/3329 |
| 2015/0363603 A1* | 12/2015 | Hsu | H04L 63/105 |
| | | | 707/783 |
| 2016/0203327 A1 | 7/2016 | Qiao et al. | |
| 2017/0091246 A1 | 3/2017 | Risvik et al. | |
| 2018/0165310 A1 | 6/2018 | Coll et al. | |

(Continued)

OTHER PUBLICATIONS

Beedkar, et al., "Compliant Geo-distributed Query Processing", In Proceedings of the International Conference on Management of Data, Jun. 20, 2021, pp. 181-193.

(Continued)

*Primary Examiner* — Dangelino N Gortayo
(74) *Attorney, Agent, or Firm* — Barta Jones, PLLC

(57) ABSTRACT

Example solutions are disclosed for performing a distributed data query for a connected data set, such as a property graph or a relational database, distributed across a plurality of regions (e.g., different geographic regions) under data flow limitations. For a restrictive limitation, a first region stores a data entity that is subject to a data flow limitation, and a second region stores only a reference to the data entity (e.g., a pseudonymous reference). The query is executed in the first region, and at least a partial representation of the state is injected into the query for execution in the second region. The query locates the reference to the data entity in the second region, and the state of the query from the second region is returned. Query results from the plurality of regions are synthesized into a final result. Further solutions address prohibitive limitations when references are not permitted.

20 Claims, 11 Drawing Sheets

(56) References Cited

U.S. PATENT DOCUMENTS

| | | | |
|---|---|---|---|
| 2018/0332008 A1 | 11/2018 | Norman et al. | |
| 2019/0294724 A1* | 9/2019 | Michelis | G06F 16/278 |
| 2021/0042377 A1* | 2/2021 | Zwicky | G06Q 30/02 |
| 2021/0117425 A1* | 4/2021 | Rao | H04L 67/1031 |
| 2021/0286812 A1* | 9/2021 | Neugebauer | G06F 16/9035 |

OTHER PUBLICATIONS

Bronson, et al., "TAO: Facebook's Distributed Data Store for the Social Graph", In Proceedings of the USENIX Conference on Annual Technical Conference, Jun. 25, 2013, pp. 49-60.

Búr, et al., "Distributed graph queries over models@run time for runtime monitoring of cyber-physical systems", In International Journal on Software Tools for Technology Transfer, vol. 22, Sep. 26, 2019, pp. 79-102.

Janke, et al., "On Data Placement Strategies in Distributed RDF Stores", In International of Workshop on Semantic Big Data, May 19, 2017, 29 Pages.

Melchiorre, Alessandro Benedetto, "Constraint-Aware Query Processing for Geo-Distributed Data", In Doctoral dissertation, TU Berlin, Mar. 28, 2019, 52 Pages.

Sharma, Arun, "Dragon: A distributed graph query engine", Retrieved from: https://engineering.fb.com/2016/03/18/data-infrastructure/dragon-a-distributed-graph-queryengine/, Mar. 18, 2016, 8 Pages.

"International Search Report and Written Opinion issued in PCT Application No. PCT/US23/018419", dated Jul. 27, 2023, 11 Pages.

Ranganathan, Karthik, "Geo-Partitioning of Data in YugabyteDB", Retrieved From: https://www.yugabyte.com/blog/geo-partitioning-of-data-in-yugabytedb/, Nov. 12, 2020, 17 Pages.

* cited by examiner

DISTRIBUTED DATA QUERY UNDER DATA FLOW LIMITATIONS

BACKGROUND

A graph database (e.g., property graph) uses a node and edge architecture, storing data entities in nodes and relationships between data entities in edges. A graph database provides value, in part, by enabling users to identify a set of data entities based on relationships among the data entities, rather than merely based on properties of the data entities themselves. In some scenarios, a graph database may be distributed among storage locations that span different geographical regions.

Data federation enables multiple databases to function as one, advantageously permitting users to leverage disparate data sources, including those that are geographically distributed. In some scenarios, federated data management even permits users to draw from databases under different data controllers.

However, for some data types, geographic dispersion may be deliberate. Privacy laws and regulations often restrict or prohibit the flow of certain data out of some geographic regions and into others. An example is cross-border data flow limitations imposed on personally identifiable information (PII).

In some scenarios, absent a suitable alternative to limit risk, data owners or controllers may impose technical measures to obstruct data searches across region boundaries, for example by flagging data that is subject to cross-border data flow limitations, automatically identifying a query origination (e.g., using a network address), and automatically blocking query results that would result in a prohibited cross-border data flow. Thus, at least some benefits of data federation are at risk of being curtailed.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for performing a distributed data query under data flow limitations include: receiving a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity; receiving a first state of an execution of the first query in the first region; receiving a second state of an execution of the first query in the second region, wherein the second state includes the reference to the first data entity; synthesizing query results of the first query from the first region and the second region into a final query result for the first query, wherein synthesizing the query results of the first query comprises replacing the reference to the first data entity with the first data entity; and reporting the final query result for the first query.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Example solutions are disclosed for performing a distributed data query for a connected data set, such as a property graph or a relational database, distributed across a plurality of regions (e.g., different geographic regions) under data flow limitations. For a restrictive limitation, a first region stores a data entity that is subject to a data flow limitation, and a second region stores only a reference to the data entity (e.g., a pseudonymous reference). The query is executed in the first region, and at least a partial representation of the state is injected into the query for execution in the second region. The query locates the reference to the data entity in the second region, and the state of the query from the second region is returned. Query results from the plurality of regions are synthesized into a final result. Further solutions address prohibitive limitations when references are not permitted.

Aspects of the disclosure improve the operations of computing devices, for example improving the completeness and accuracy of distributed data queries when the data is under data flow limitations that may otherwise render responsive search results unavailable (e.g., the search query may be blocked, or the data may not be locatable). This is accomplished at least by receiving a state of an execution of the query in a second region, wherein the second state includes a reference to a data entity, and replacing the reference to the data entity with the data entity. Further, the disclosure manages use of computing resources such as memory, processing, and network bandwidth.

Figure 1:
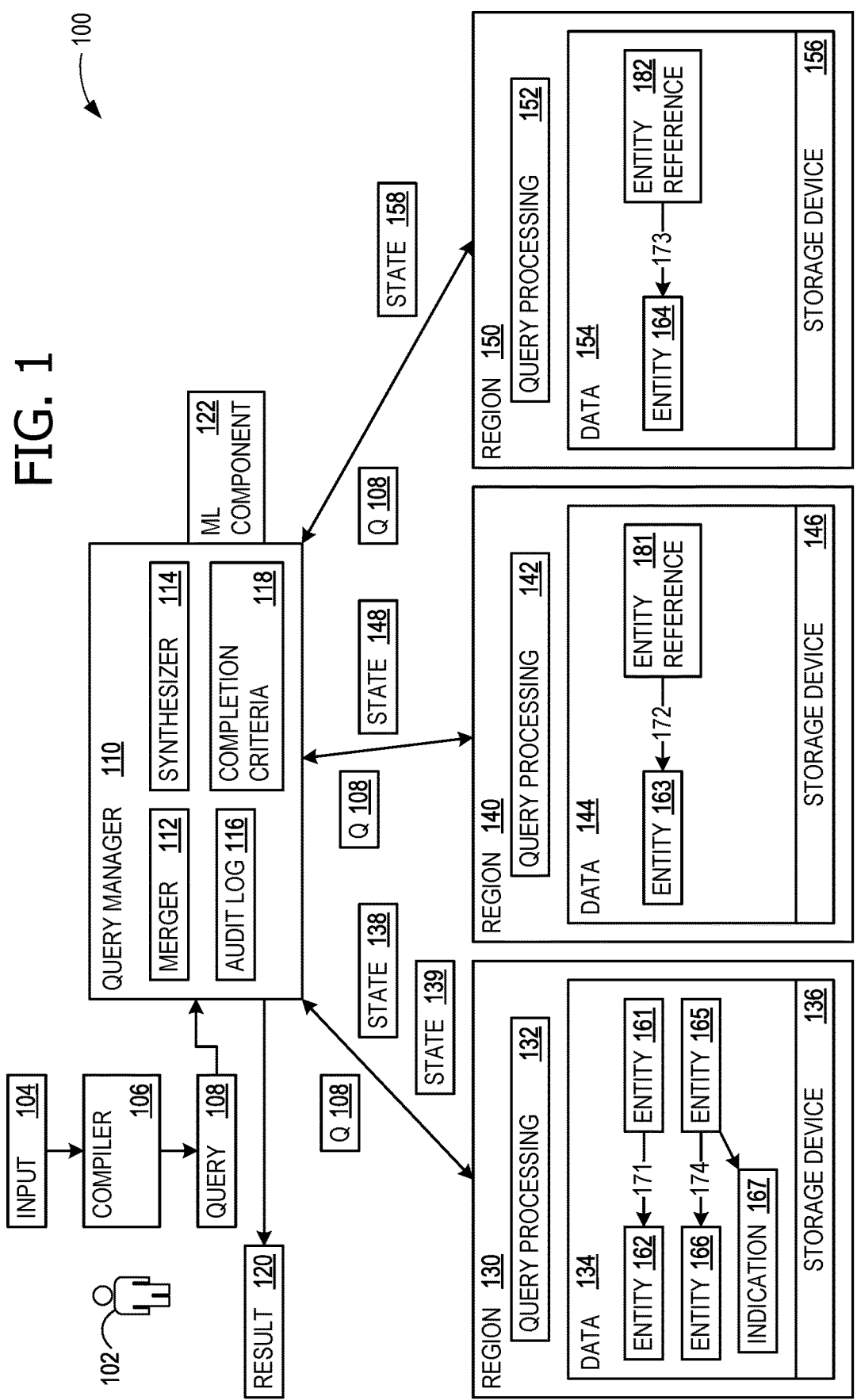
FIG. 1 illustrates an example architecture that performs a distributed data query under data flow limitations.

FIG. 1 illustrates an example architecture 100 that advantageously performs a distributed data query under data flow limitations. A user 102 provides an input 104 to a query compiler 106, which generates a query 108 that is passed to a query manager 110. Query manager 110 queries a distributed connected data set 200 (see FIG. 2) that is separated (e.g., distributed) across a plurality of regions 210 (including a region 130, a region 140, and a region 150) and returns a final query result 120 to user 102.

In some examples, data set 200 comprises a property graph with nodes (e.g., data entities) and relationships among data entities (e.g., edges). In some examples, data set 200 comprises a relational database. Some examples use other types of data that may be queried, such as a data set having links or references among data entities. Each of the data entities and each of the relationships may have a unique global identifier in data set 200. An example input 104 in natural language form is "starting from John, provide all the names of people with whom John corresponded via email within the last 30 days." An example query 108 would then be "MATCH (user)-[rel:CorresopondedEM_With]→(correspondentEM); WHERE id(user)=<John_ID>; AND rel.Created>datetime( )–duration({days: 30}); RETURN correspondentEM.Name".

Figure 2:
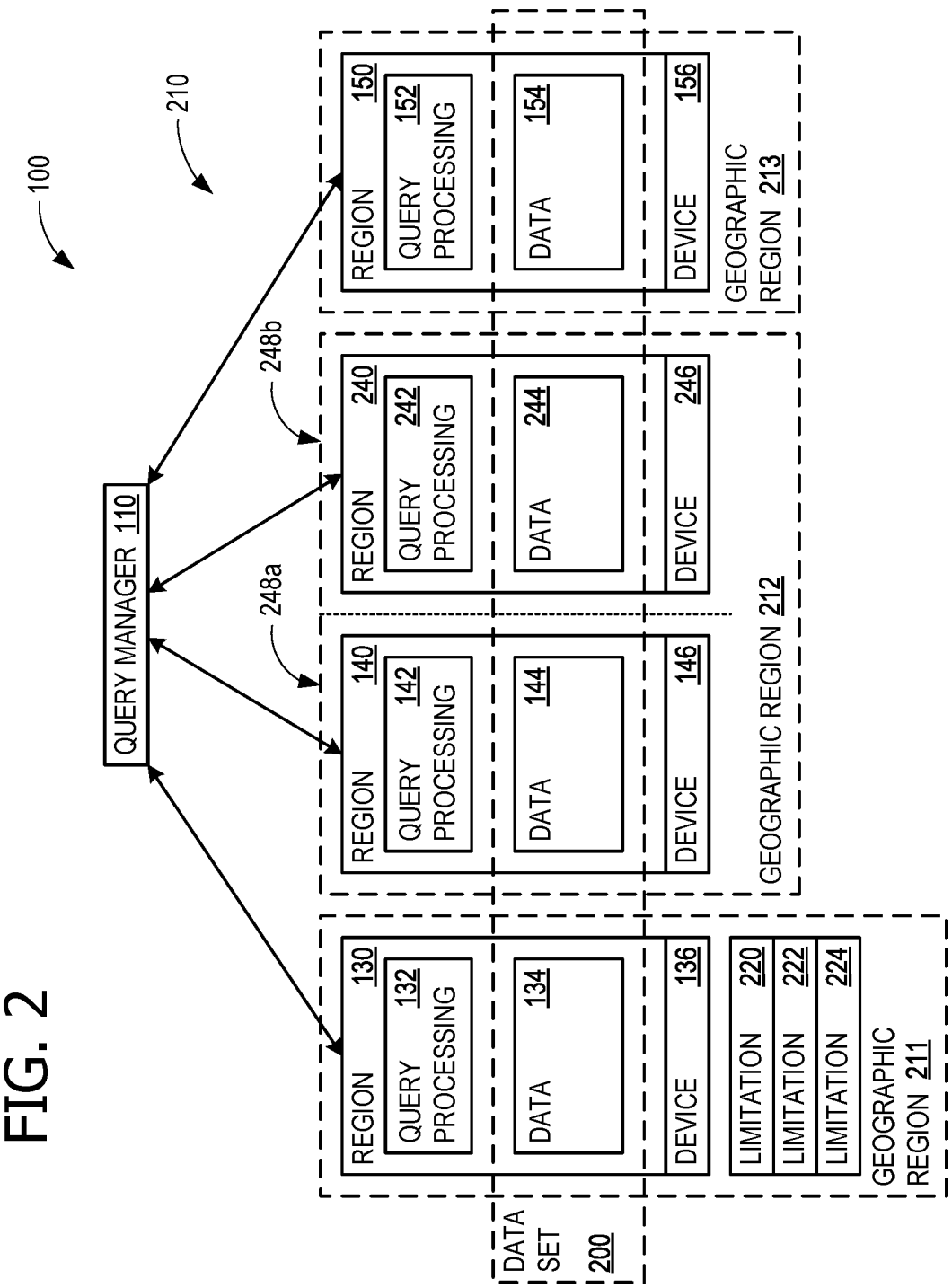
FIG. 2 illustrates further aspects of the architecture of FIG. 1.

Turning briefly to FIG. 2, further detail is shown regarding the separation of data set 200 across plurality of regions 210 in architecture 100. Region 130 is within a geographic region 211 and has its own query processing 132 and regional data 134 on a storage device 136. In some examples, storage device 136 (and the other storage devices of architecture 100) may be a set of physical storage devices, such as an array of magnetic storage media, or a virtual storage solution. Query processing 132 executes query 108 on data within regional data 134.

Region 140 is within a geographic region 212 and has its own query processing 142 and regional data 144 on a storage device 146. Query processing 142 executes query 108 on data within regional data 144. Region 240 is also within geographic region 212 and has its own query processing 242 and regional data 244 on a storage device 246. Query processing 242 executes query 108 on data within regional data 244. Regions 140 and 240 are in a common geographic region (geographic region 212) but separated into a plurality of data storage allocations 248a and 248b, for example by different tenant accounts. Data storage allocation 248a hosts region 140 and data storage allocation 248b hosts region 240. In some examples, a common storage solution is used, and the separation is enforced logically within a data center. Region 150 is within a geographic region 213 and has its own query processing 152 and regional data 154 on a storage device 156. Query processing 142 executes query 108 on data within regional data 144.

At least some data within regional data 134 is subject to data flow limitations, such as a data flow limitation 220, a data flow limitation 222, and a data flow limitation 224. Data flow limitations may be imposed, for example, to ensure compliance with privacy laws and regulations and/or to protect proprietary information (e.g., customer content) across physically and logically-separate regions. Data flow limitations may be asymmetric, prohibiting transfer of some information out of a region while permitting transfer of that same type of information into a region. Different regions may impose different data flow limitations, based upon policies implemented by data owners.

Data flow limitation 220 is a restrictive policy that permits storage of end-user pseudo-anonymous (pseudonymous) information (EUPI) in place of end-user identifiable information (EUII) outside of a data subject's (principle's) primary region. Thus, some data entities within regional data 134 are represented by references (e.g., shadow representations) to the data entity outside regional data 134 (e.g., in any of regional data 144, 154, and/or 244). Data flow limitation 222 is a prohibitive policy that prohibits storage of even EUPI outside of a data subject's primary region. Thus, some data entities within regional data 134 will not have even any references to outside regional data 134 (e.g., in any of regional data 144, 154, and/or 244).

Data flow limitation 224 is another policy that applies to relationships, rather than data entities, prohibiting storage of relationships among data entities (e.g. prohibits edges) outside regional data 134. In some examples, relationships (e.g., edges in a property graph) are sensitive. This may occur in scenarios in which the number of data entities (e.g., nodes) that may have such a relationship are so limited in number that the fact that a relationship is identified also reveals (at least with some degree of certainty) identifying information about a data entity outside of the data entity's primary region. In some examples, data flow limitation 224 is not a blanket limitation applying to exporting a relationship to any regions outside a primary region, but may be limited to importing a relationship to only a specific set of regions.

Storage of data in data set 200 across plurality of regions 210 may be optimized for performance, cost, or some balance between the two. To optimize for cost, data is stored only in its primary region, and duplication in other regions is avoided to the extent practical. This generally results in longer execution times for queries, due to the need to individually query each region and return and merge the states of each region. To optimize for performance, data is duplicated in other regions, subject to data flow limitations. This generally results in quicker execution times for queries, because much (or possibly all) of the data is returned in early query states.

Thus, distribution of data set 120 among disparate regions may include differing geographical regions, differing logical regions (within the same geographic region), or both. In some scenarios, data set 120 may be distributed between on-premises ("on-prem") resources and cloud resources. In such scenarios, data flow limitations may restrict data flow between on-prem and cloud resources (in either direction).

Returning to FIG. 1, query manager 110 has a merger 112 that merges returned query states from the various different regions. Operation of query manager 110 with respect to data flow limitation 220 ("restricted") is described first. In this scenario, a data entity 161 is a subject of query 108, and a relationship 171 connects data entity 161 to a data entity 162. Query 108 is transmitted first to region 130, and executed by query processing 132, which returns state 138 based on data located within regional data 134. State 138 is the state of the initial execution of query 108 in region 130. In the search example described above, data entity 161 is "John", relationship 171 is "email correspondence within the last 30 days", and data entity 161 is information on another person with whom John corresponded via email within the last 30 days.

Merger 112 receives state 138 and injects at least a portion of state 138 into query 108. State 138 may be pruned, for example to remove data entity 161 and replace data entity 161 with a reference to data entity 161, in order to avoid exporting data entity 161 from region 130 into another region. Query manager 110 transmits query 108 (with the pruned version of state 138) to at least region 140 and region 150. In some examples, query 108 is executed in parallel in regions 140 and 150, by query processing 142 and 152, respectively. Query processing 142 locates a data entity 163 within regional data 144 using a relationship 172 and query processing 152 locates a data entity 164 within regional data 144 using a relationship 173.

Relationships 172 and 173 duplicate relationship 171 (also "email correspondence within the last 30 days"), although both are tied to references to data entity 161, rather than copies of data entity 161. Region 140 has a reference 181 to data entity 161, and region 150 has a reference 182 to data entity 161. In some examples, references 181 and 182 are pseudonymous representations of data entity 161, for example showing "Subject 123X" in place of "John". State 148 is returned to query manager 110 from region 140 and state 158 is returned to query manager 110 from region 150. States 148 and 158 include their respective shadow representations (e.g., references 181 and 182) of data entity 161.

Merger 112 merges states 138, 148, and 158. In some scenarios, open-ended queries that may result in recursive searching (e.g., "starting from John, provide all the names of people in the database who corresponded via email with anyone else within the last 30 days") may require returning the search to region 130. Such recursive searching is described in further detail in relation to FIGS. 5 and 6, and continues the query until completion criteria 118 is satisfied.

After merger 112 has injected at least a portion of state 138, 148, and 158 into query 108, query manager 110 transmits query 108 to region 130 again. Query processing 132 executes query 108 again and returns state 139. Upon completion of query 108, a synthesizer 114 synthesizes the query results from the various regions into final query result 120. In some examples, during synthesis, the data entities and relationships are merged as retrieved from individual regions, and query processing is re-run on top of the merged state, by injecting the complete state as gathered from each region individually. If query 108 had been executed from within region 130, in which data entity 161 may be revealed, references 181 and 182 are replaced with data entity 161 (which may be retrieved from region 130) in final query result 120. In some examples, if query 108 had been executed from within region 140, in which data entity 161 may not be revealed, reference 181 will remain in final query result 120 in place of data entity 161.

Operation of query manager 110 with respect to data flow limitation 222 ("prohibited") is described next; operation of query manager 110 with respect to data flow limitation 224 ("prohibited relationship") has similarities, as noted below. In this scenario, a data entity 164 is a subject of query 108, and a relationship 174 connects data entity 164 to a data entity 165. Query 108 is transmitted to region 130, and executed by query processing 132, which returns state 138 based on data located within regional data 134. Because of data flow limitation 222, no copies of data entity 164, or even references to data entity 164, are stored outside region 130. In the event of data flow limitation 222, there will be no copies of relationship 174 outside region 130, meaning that results will not be locatable in any regions subject to data flow limitation 222.

In some examples, an indication 167 indicates whether there is data in regions outside region 130. If indication 167 indicates that there is no data in any region outside region 130, only region 130 is queried (searched). If indication 167 indicates that there is data in a specific region or regions outside region 130, only the specified region(s) are searched. If indication 167 indicates that there is data outside region 130, but does not specify which region, all other regions are searched. Queries involving data entities that are subject to "prohibited" data flow limitations may use completion criteria 118 to identify when the query is complete.

In some examples, an audit log 116 tracks the returned states and injections into queries, identifying which data entities and representations are returned from which regions, and whether a data entity or only a representation was injected into a query transmitted to a specific region. This facilitates compliance auditing, and assists with establishing that a data entity was not exported during the performance of a query, and that no copies of a data entity were located in a region in which the data entity should have had only a representation. For example, states (e.g., query results) may be tagged based on the region from which they were received, and queries with injected (e.g., pruned) states may be tagged based on the region to which they were transmitted.

Query manager 110 may be located in any one of regions 130, 140, and 150, and in some examples, each region has its own copy of query manager 110 in order to carry out queries originating within that region. In some examples, the operations described for query manager 110 are performed in a peer-to-peer manner. A machine learning (ML) component 122 (or other logic, in some examples) selects which region is queried first, as described below, in relation to FIG. 8.

Figure 3:
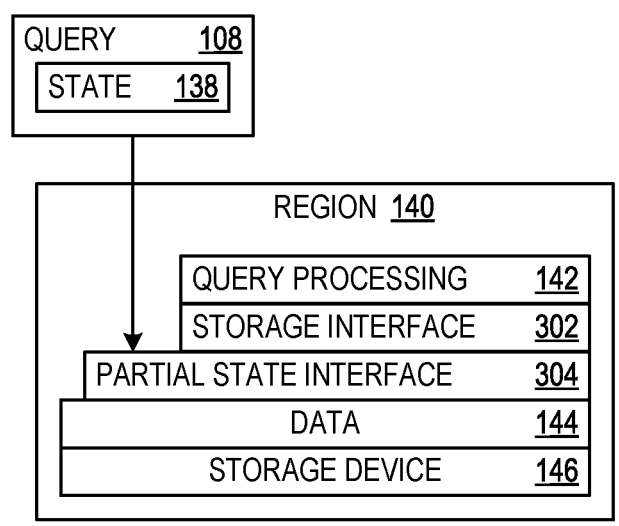
FIG. 3 illustrates further aspects of the architecture of FIG. 1.

FIG. 3 illustrates partial state injection, for example in region 140. The other regions 130, 150, and 240, have similar capability. Within region 140 are query processing 142, a storage interface 302 that permits query processing 142 to access regional data 144 on storage device 146, and a partial state interface 304. Query 108, with an injected pruned state 138 is provided to partial state interface 304.

After completing a query execution in one region, partial results (e.g., a state) are returned. The query may then be executed in a different region based at least partially on data found in a previously-searched region. Each query processing stage (e.g., query processing 142) evaluates a query within each region locally, and interfaces with the contents of a region using individual operations performed on data set 200. These operations include four core capabilities: (1) the ability to locate a data entity, given an identifier, (2) the ability to locate a relationship given a data entity and the direction of the relationship, (3) the ability to locate a data entity given a relationship and the data entity on the opposing end of the relationship, and (4) the ability to retrieve a relationship given its identifier. Synthesis also requires these capabilities to be exposed, however for recording partial query results, results may be referenced locally.

Partial state interface 304 resides underneath query processing 142, and other regions are similarly configured. One benefit of evaluating queries close to the data is reduced network transfer, due to filtering. Partial state interface 304 records interactions with the underlying storage (e.g., storage device 146), as observed by query processing 142, and detects the presence of referenced properties on individual data entities and references.

For traversing across relationships distributed across multiple regions, the discovery of a data entity by traversing a relationship stored in another region depends on the data entity being available for addressing it in all regions. Referencing the example query described above, the starting point of the query ("John") must be available in all regions for the relationship and opposing data entities to be discoverable.

Partial state interface 304 therefore also records each valid (not containing references) data entity and reference observed in the execution. To ensure completeness across regions, partial state interface 304 records a complete representation of the data within each region. This permits construction of a merged representation of the entire query result.

To illustrate, an example query predicate is "WHERE rel.Created>datetime( )–duration({days: 30})". This example query predicate will restrict traversal to include only relationships which meet the 30-day criteria. If, for example, the relationship "rel" contains a referenced property "Created" that is empty, the condition cannot be met because the outcome is unknown. Thus, references are treated as a specific data type that, when detected, defers the predicate until the reference has been substituted with the actual property (e.g., the actual data entity or relationship).

If a predicate may be evaluated immediately, and the criteria are not met, the corresponding result is discarded. However, if a predicate may not be evaluated immediately (e.g., a reference is used and the value is unknown) the corresponding result is retained until evaluation may be performed (e.g., during synthesis, when references are replaced with actual values, or possibly earlier, during merging). The benefit of this approach is that the relationship will be traversable and recorded in the partial state interface 304.

Other content-dependent processing is similarly managed. For example, a query sorts content, keyed by a property, and the output is limited to only the top N items. If the sorting key contains a reference, the sort is deferred until a rich representation of the data is available.

To ensure completeness (e.g., full recall of the data as specified through the query parameters) is achievable for a distributed query, the resulting rich representation takes as input recorded states from the individual regions. Transferring state among individual regions is expensive for queries that process large amounts of data. To reduce this state transfer, predicate evaluation for known values potentially filters out a large subset of data, determined to be invalid for the purposes of the query fulfillment. The filtered-out data items may be discarded. In some examples, hints are provided to query processing 142 that certain data entities and/or relationships are excluded from candidate results transferred back for synthesis of the complete query response.

Figure 4:
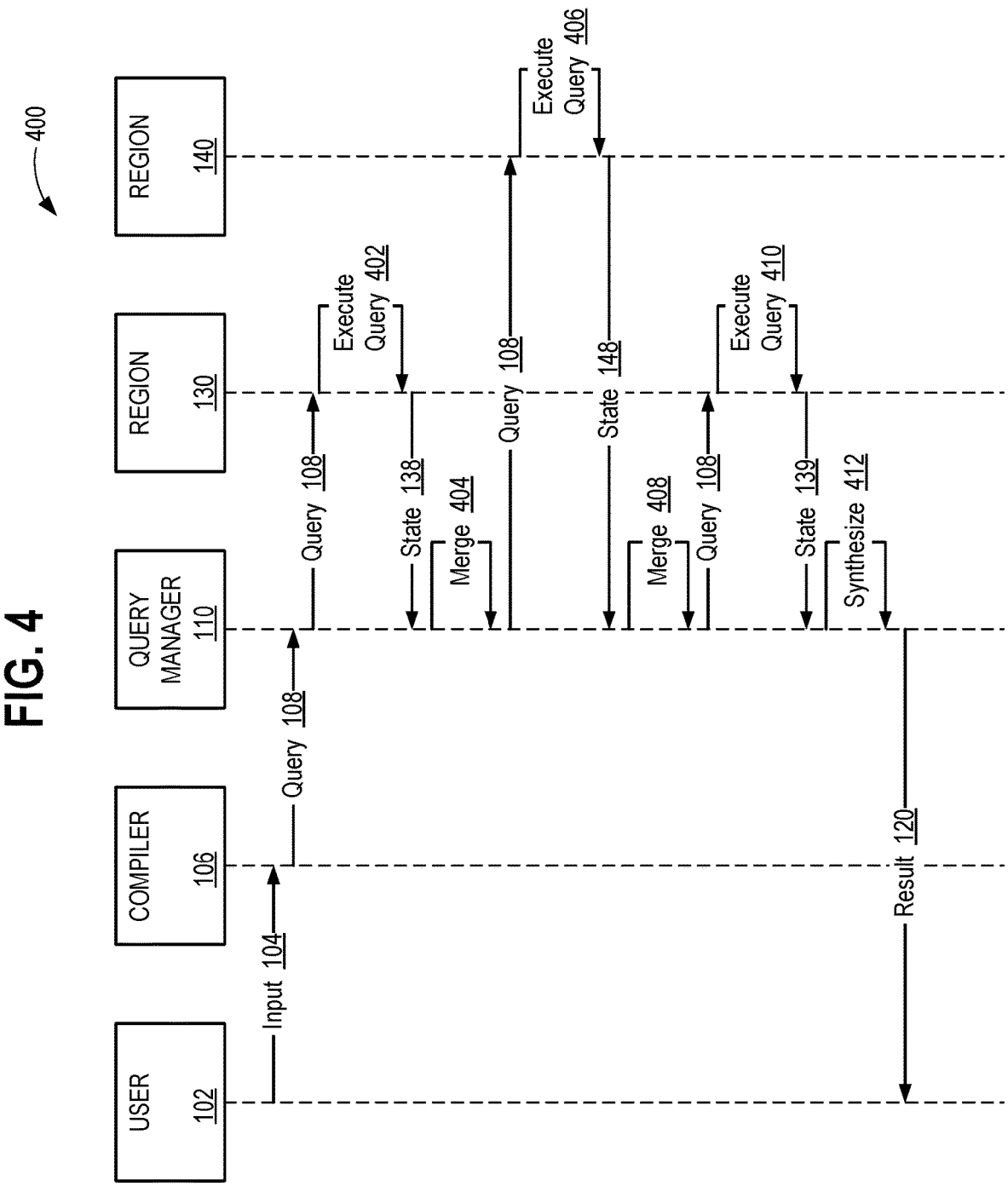
FIG. 4 shows a message sequence diagram of messaging that may occur when using examples of the architecture of FIG. 1.

FIG. 4 shows a message sequence diagram 400 of messaging that may occur when using examples of architecture 100. User 102 provides input 104 to query compiler 106, which generates query 108 and passes query 108 to query manager 110. Query manager 110 transmits query 108 to region 130, first. The selection of the first region, to which query 108 is transmitted, is described in relation to FIG. 8.

Query 108 is executed in region 130, shown as operation 402, and state 138 is returned to query manager 110. Query manager 110 merges a pruned version of state 138 (to avoid exporting data entity 161 from region 130) into query 108, shown as operation 404, and transmits query 108 to region 140. Query 108 is executed in region 140, shown as operation 406, and state 148 is returned to query manager 110. In some examples, query 108 may be complete with state 148.

Otherwise, query manager 110 merges state 148 into query 108, shown as operation 408, and transmits query 108 to region 130 again. Query 108 is executed in region 130, shown as operation 410, and state 139 is returned to query manager 110. Query manager 110 synthesizes final query result 120 using states 138, 148, and 139 (shown as operation 412), and transmits final query result 120 to user 102.

Figure 5:
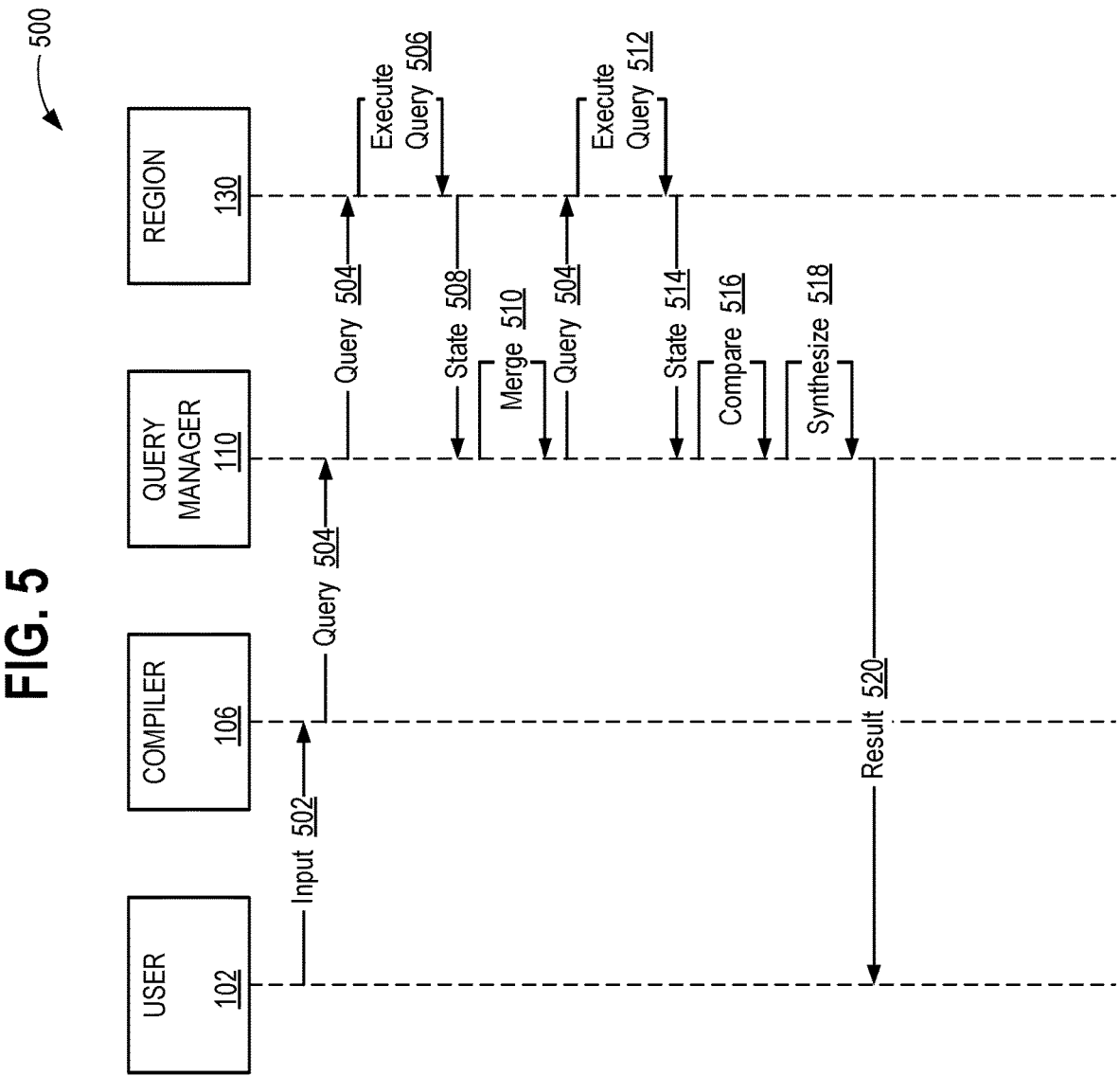
FIG. 5 shows another message sequence diagram of messaging that may occur when using examples of the architecture of FIG. 1.

FIG. 5 shows a message sequence diagram 500 of messaging that may occur when using examples of architecture 100 with completion criteria 118 to determine whether a query has converged. This convergence check may be used for prohibitive data flow limitations (e.g., data flow limitation 222) and open-ended queries.

User 102 provides input 502 to query compiler 106, which generates a query 504 and passes query 504 to query manager 110. Query manager 110 transmits query 504 to region 130. Query 504 is executed in region 130, shown as operation 506, and state 508 is returned to query manager 110. Query manager 110 merges state 508 into query 504, shown as operation 510, and transmits query 504 back to region 130. Query 504 is executed in region 130 again, shown as operation 512, and state 514 is returned to query manager 110.

One example of completion criteria 118 is that two subsequent query states are the same, indicating that no new data entities have been discovered (e.g., the query has converged). Thus, query manager 110 compares state 508 with state 514, shown as operation 516. If they are the same, query manager 110 synthesizes final query result 520 (shown as operation 518), and transmits final query result 520 to user 102.

Figure 6:
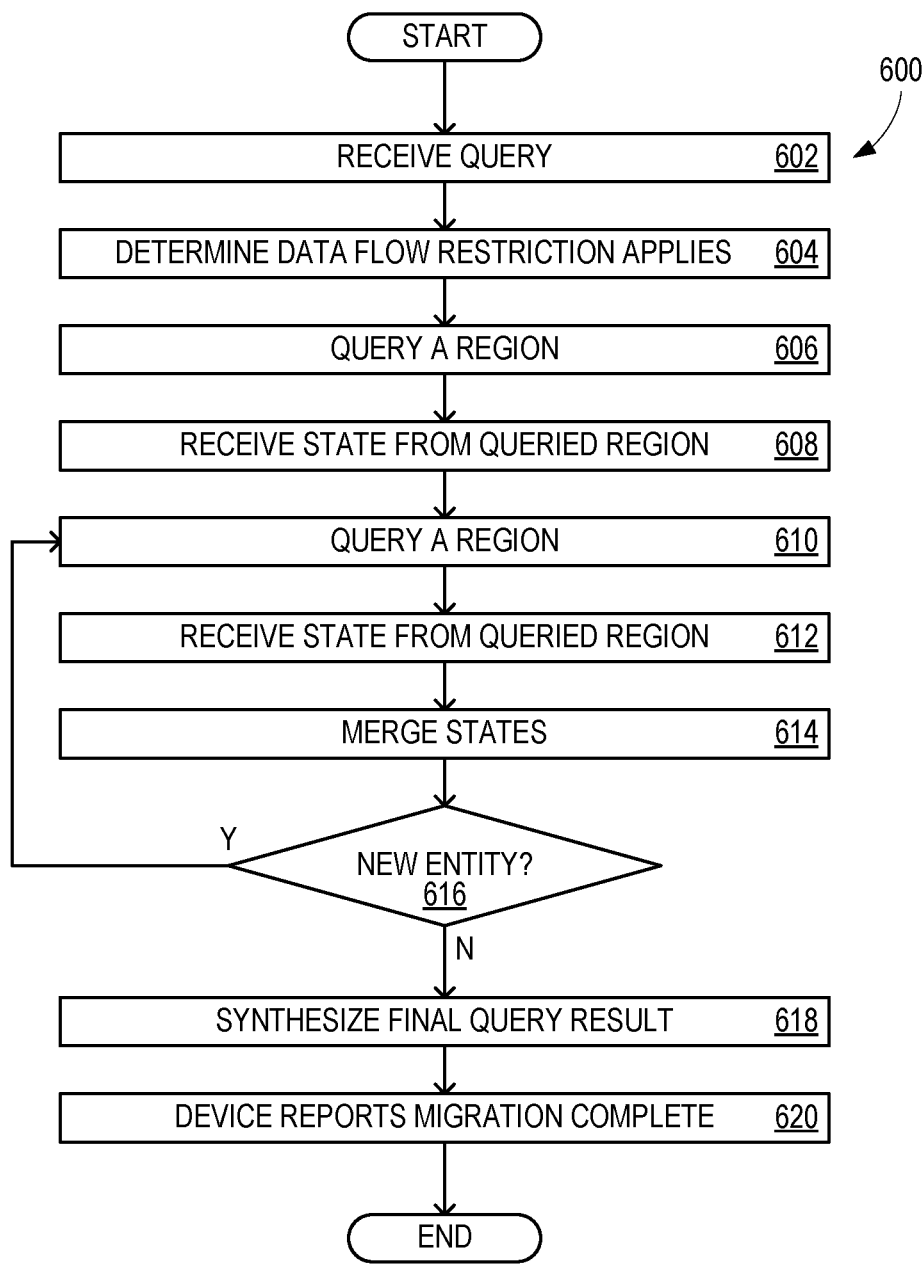
FIG. 6 shows a flowchart illustrating exemplary operations that may be performed in conjunction with the message sequence diagram of FIG. 5.

FIG. 6 shows a flowchart 600 illustrating exemplary operations that may be performed in conjunction with message sequence diagram 500. In some examples, operations described for flowchart 600 are performed by computing device 1100 of FIG. 11. Flowchart 600 implements a convergence check that may be described using the following pseudocode:

```
a = Ø
b = Ø
do
{
   b = a
   a = query( )
   c = a ∩ b
}
while(|c| != |a|)
```

If the cardinality of the intersection of all retrieved data entities and relationships (e.g., nodes and edges) in the previous iteration is equal to that of the current iteration, no new entities were discovered and the query is converged. However, if any progress has been made on a query (e.g., at least one additional data entity is discovered), it cannot be determined whether the query has converged.

For example, when a query is transmitted to region 140, after execution in region 130, partial state interface 304 (see FIG. 3) will serve both locally sourced data (e.g., from regional data 144) as well as data transmitted from region 130 (via state 138). When the query execution concludes in region 140, query manager 110 (or another element of architecture 100) determines whether any progress was made beyond state 138. If so, there is no certainty that the query is complete, and query manager 110 injects state 148 into the query and transmits the query to region 130 again (as shown in message sequence diagram 400 of FIG. 4). This is repeated until the query satisfies completion criteria 118.

Flowchart 600 commences with operation 602, in which query manager 110 receives a query for data set 200.

Operation 604 determining that a first region to be queried (e.g., region 130) is subject to a data flow limitation on a data entity (e.g., data flow limitation 222 on data entity 165). The first region stores the data entity, and a second region to be queried (e.g., region 140) does not store either the data entity or a reference to the data entity.

The first region is queried in operation 606, and the state (e.g., state 138) is received by query manager 110 in operation 608, and injected into the query. In operation 610, query manager 110 transmits the query to other regions (e.g., region 140), where it is executed. In operation 612, a state (e.g., state 148) is received for each region (queried in operation 610) by query manager 110, and merger 112 of query manager 110 merges the received states into an intermediate query result, in operation 614.

Decision operation 616 determines whether new data entities are discovered in the current query result (e.g., based on states 138 and 148). If so, flowchart returns to operation 610 to query the first region again. The next state from the first region (e.g., state 139) is received in operation 612, and merger 112 merges the latest state into another intermediate query result.

When looping through operations 610-616, eventually no new data entities will be discovered, so the most recent intermediate query result will be the same as the immediately prior intermediate query result. That is, decision operation 616 determines that no new data entities are discovered in the current (most recent) intermediate query result, relative to a prior intermediate query result. This satisfies completion criteria 118, in some examples. In operation 618, based on at least determining that no new data entities are discovered in the current intermediate query result, synthesizer 114 synthesizes query results of the query from the queried regions into a final query result. Operation 620 reports the final query result for the query.

Figure 7:
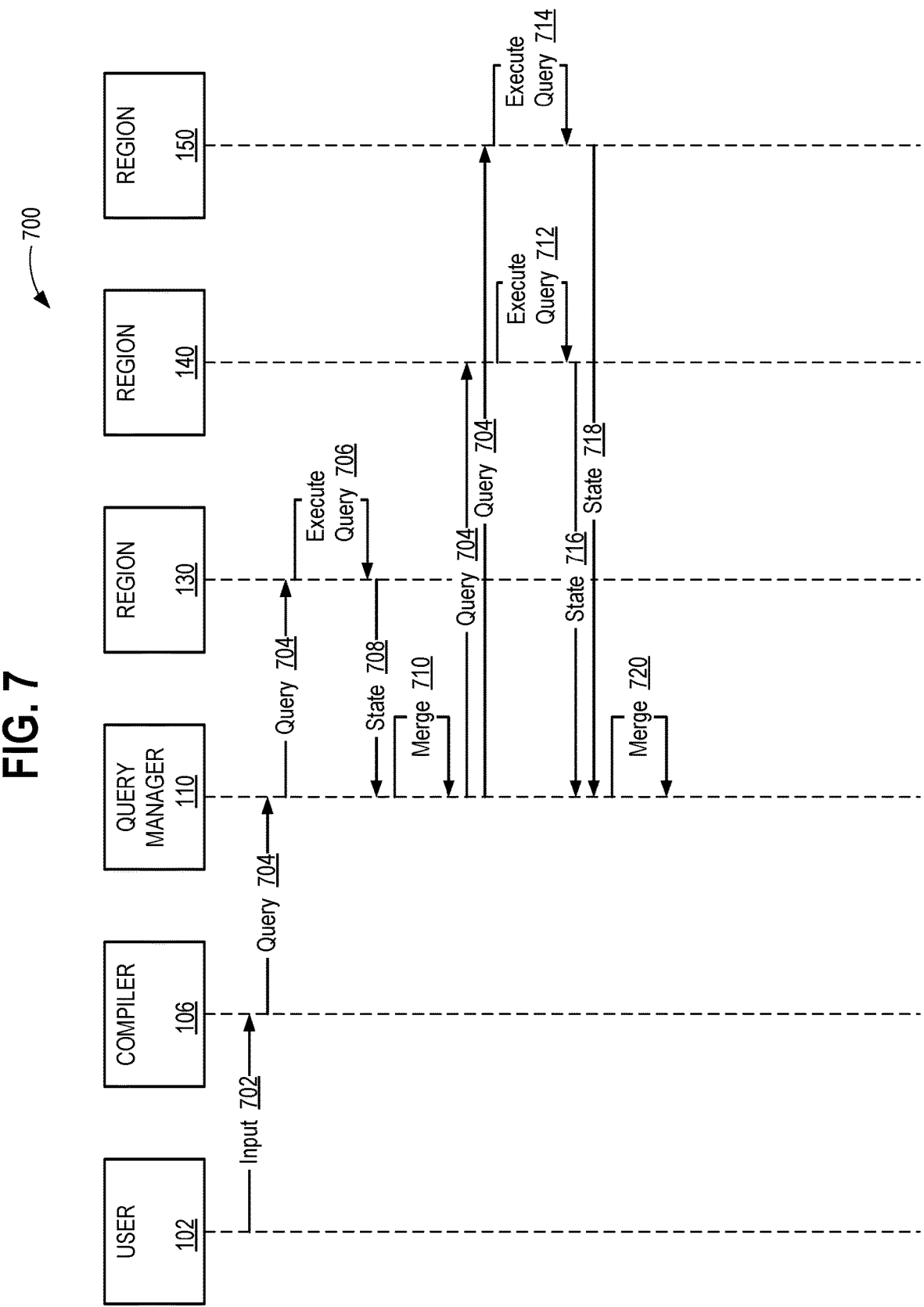
FIG. 7 shows another message sequence diagram of messaging that may occur when using examples of the architecture of FIG. 1.

FIG. 7 shows another message sequence diagram 700 of messaging that may occur when executing a query in parallel in multiple regions. User 102 provides input 702 to query compiler 106, which generates a query 704 and passes query 704 to query manager 110. Query manager 110 transmits query 704 to region 130. Query 704 is executed in region 130, shown as operation 706, and state 708 is returned to query manager 110. Query manager 110 merges pruned state 708 into query 704, shown as operation 710, and transmits query 704 to both region 140 and 150.

Query 704 is executed in region 140 (shown as operation 712) in parallel with execution in region 150 (shown as operation 714). State 716, from region 140 and state 718, from region 150, are returned to query manager 110 and merged into the current state of query 704, in operation 720.

Figure 8:
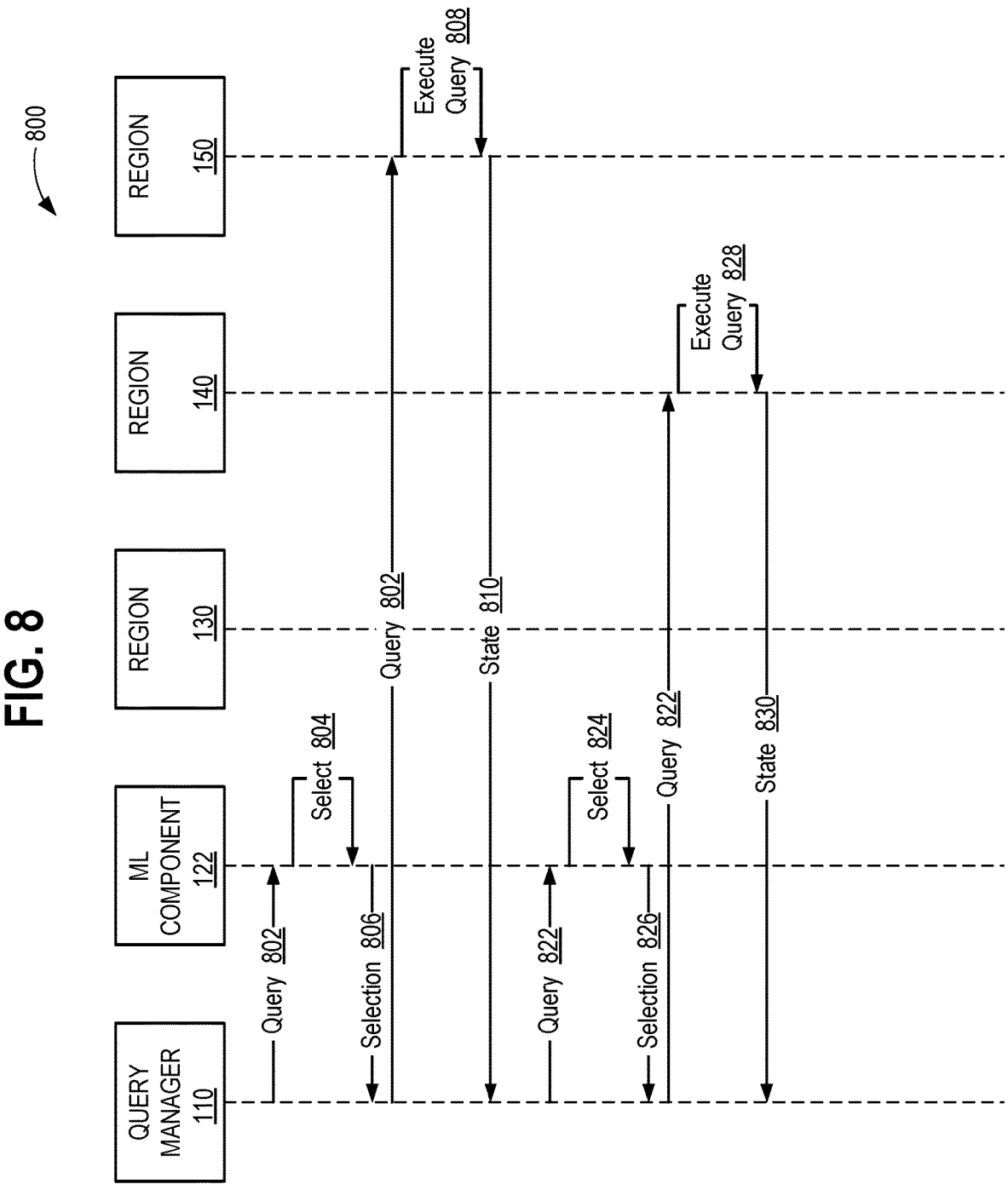
FIG. 8 shows another message sequence diagram of messaging that may occur when using examples of the architecture of FIG. 1.

FIG. 8 shows another message sequence diagram 800 of messaging that may occur when selecting a region in which to begin a query. In general, each tenant has a default data location, and queries may begin in the default data location. However, in some scenarios, it may be beneficial to begin a query in another region, for example if another region has more complete data, or there is some other phenomenon that results in queries executing more rapidly when beginning in a particular region. In some examples, there may be selection criteria for different classes of queries.

However, in some examples, ML component 122 determines a starting region of plurality of regions 210 in which to start a query. Factors such as tenant size, users, the query itself, or other features, may be relevant to determining the preferable starting region (e.g., the starting region providing superior query performance).

Query manager 110 transmits query 802 to ML component 122. ML component selects region 150 as the starting region, in operation 804, and returns the identification of region 150 to query manager 110 as a message 806. Query manager 110 transmits query 802 to region 150. Query 802 is executed in region 150, shown as operation 808, and state 810 is returned to query manager 110.

At a later time, query manager 110 transmits query 822 to ML component 122. Query 822 differs from query 802 by some aspect, so ML component now selects region 140 as the starting region, in operation 824, and returns the identification of region 140 to query manager 110 as a message 826. Query manager 110 transmits query 822 to region 140. Query 822 is executed in region 140, shown as operation 828, and state 830 is returned to query manager 110.

Figure 9:
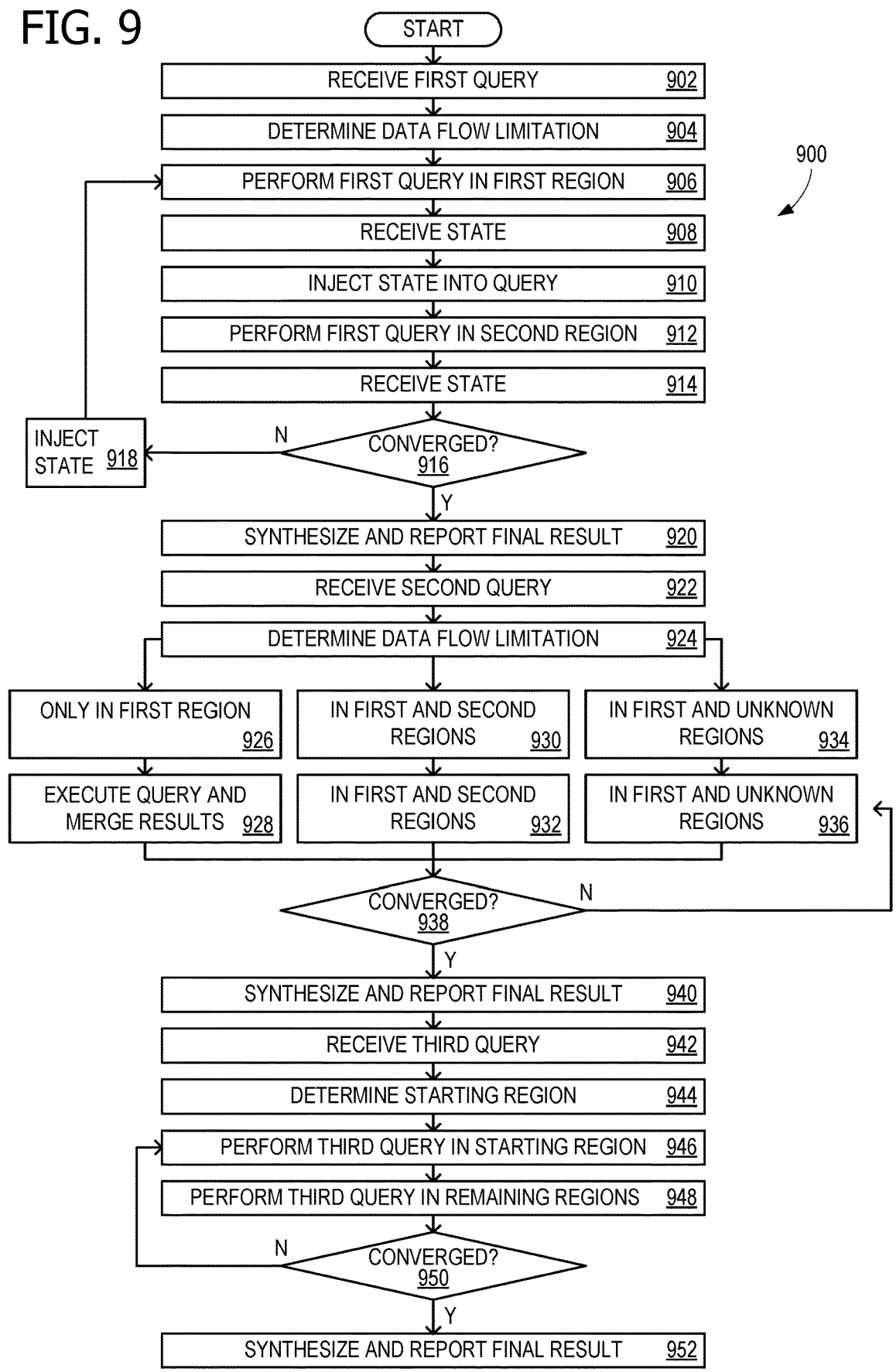
FIG. 9 shows a flowchart illustrating exemplary operations for distributed data queries under data flow limitations, as may be performed using examples of the architecture of FIG. 1.

FIG. 9 shows a flowchart 900 illustrating exemplary operations that may be performed using examples of architecture 100. In some examples, operations described for flowchart 900 are performed by computing device 1100 of FIG. 11. Flowchart 900 commences with operation 902, which includes receiving query 108 for connected data set 200 distributed across plurality of regions 210 comprising region 140 and region 150.

In some examples, data set 200 comprises a property graph or a relational database. In some examples, plurality of regions 210 comprises a plurality of data storage devices separated into different geographic locations. In some examples, plurality of regions 210 comprises a plurality of data storage allocations in a common geographic location, separated by different tenant accounts. Some examples perform queries using a central query manager 110, located in at least one region. Some examples perform queries as a peer-to-peer operation among the regions of plurality of regions 210.

Operation 904 determines that data region 130 is subject to data flow limitation 220 on data entity 161. Region 130 stores data entity 161 and region 140 stores reference 181 to data entity 161 in place of storing data entity 161. Operation 906 transmits query 108 to region 130 and executes query 108 within region 130. State 138 of the execution of query 108 in region 130 is received in operation 908 and operation 910 injects, into query 108, at least a portion of state 138 (e.g., pruned state 138).

Operation 912 transmits query 108, with the portion of state 138, to region 140, and executes query 108 within region 140. State 148 of the execution of query 108 in region 140 is received in operation 914. State 148 includes reference 181 to data entity 161. Decision operation 916 performs a convergence determination, as described for flowchart 600. If convergence has not been achieved, flowchart 900 moves to operation 918 to inject at least a portion of state 148 into query 108, and then cycles through operations 906-918 to iteratively execute the query until completion criteria 118 is satisfied.

For example, in the second pass, operation 906 transmits query 108, with the portion of state 148, to region 130, and operation 908 receives state 139 of the execution of query 108 in region 130. When convergence is achieved, flowchart 900 moves to operation 920. Operation 920 synthesizes query results of query 108 from region 130 and region 140 into final query result 120 for query 108. In some examples, synthesizing the query results of query 108 comprises replacing reference 181 to data entity 161 with data entity 161. In some examples, synthesizing query results of query 108 from region 130 and region 140 comprises merging the first state with the second state. Operation 920 also reports final query result 120 for query 108.

In operation 922, query manager 110 receives a second query (e.g., query 704) for data set 200. Operation 924 determines that region 130 is subject to data flow limitation 222 on data entity 165. Region 130 stores data entity 165; region 140 does not store either data entity 165 or a reference to data entity 165; and region 150 also does not store either data entity 165 or a reference to data entity 165. Three branches are shown for flowchart 900.

Operation 926 (in conjunction with operation 924) determines that an indication (e.g., indication 167) exists within region 130 that no data entities outside region 130 are related to data entity 165. Based on at least determining that an indication exists within region 130 that no data entities outside region 130 are related, operation 928 executes the second query within region 130 and does not execute the third query within region 140 or region 150.

Alternatively, operation 930 (in conjunction with operation 924) determines that an indication (e.g., indication 167) exists within region 130 that a data entity within region 140 is related to data entity 165. Based on at least determining that an indication exists within region 130 that a data entity within region 140 is related, operation 932 executes the second query within region 130 and within region 140 (but not within region 150).

Alternatively, operation 934 (in conjunction with operation 924) determines that an indication (e.g., indication 167) exists within region 130 that a data entity within an unspecified region outside region 130 is related to data entity 165. Based on at least determining that an indication exists within region 130 that a data entity within an unspecified region outside region 130 is related, operation 936 executes the second query within region 130, within region 140, and within region 150. In some examples, this includes executing queries within region 140 and within region 150 in parallel. Decision operation 938 performs a convergence determination, as described for flowchart 600. If convergence has not been achieved, flowchart 900 moves to the relevant one of operation 928, 932, or 936 to iteratively execute the query until completion criteria 118 is satisfied. When convergence is achieved, flowchart 900 moves to operation 940. Operation 940 synthesizes query results of the query, from all regions of plurality of regions 210 that return data entities or references to data entities, into the final query result. Operation 940 also reports the final query result.

Another (third) query is received for data set 200 in operation 942. In operation 944, ML component 122 determines a starting region of plurality of regions 210 in which to start the third query. In some examples, determining the starting region comprises determining the starting region based on at least one aspect of the query selected from the list consisting of: a characteristic of a user performing the query; a characteristic of a data owner of data set 200; a characteristic of data set 200; and a characteristic of the query.

Operation 946 transmits the third query to the starting region and executes the third query within the starting region. Operation 948 transmits and executes the query in the remaining regions. Decision operation 950 performs a convergence determination, as described for flowchart 600. If convergence has not been achieved, flowchart 900 moves back to operation 946 iteratively execute the query until completion criteria 118 is satisfied. When convergence is achieved, flowchart 900 moves to operation 952. Operation 952 synthesizes query results and reports the final query result.

Figure 10:
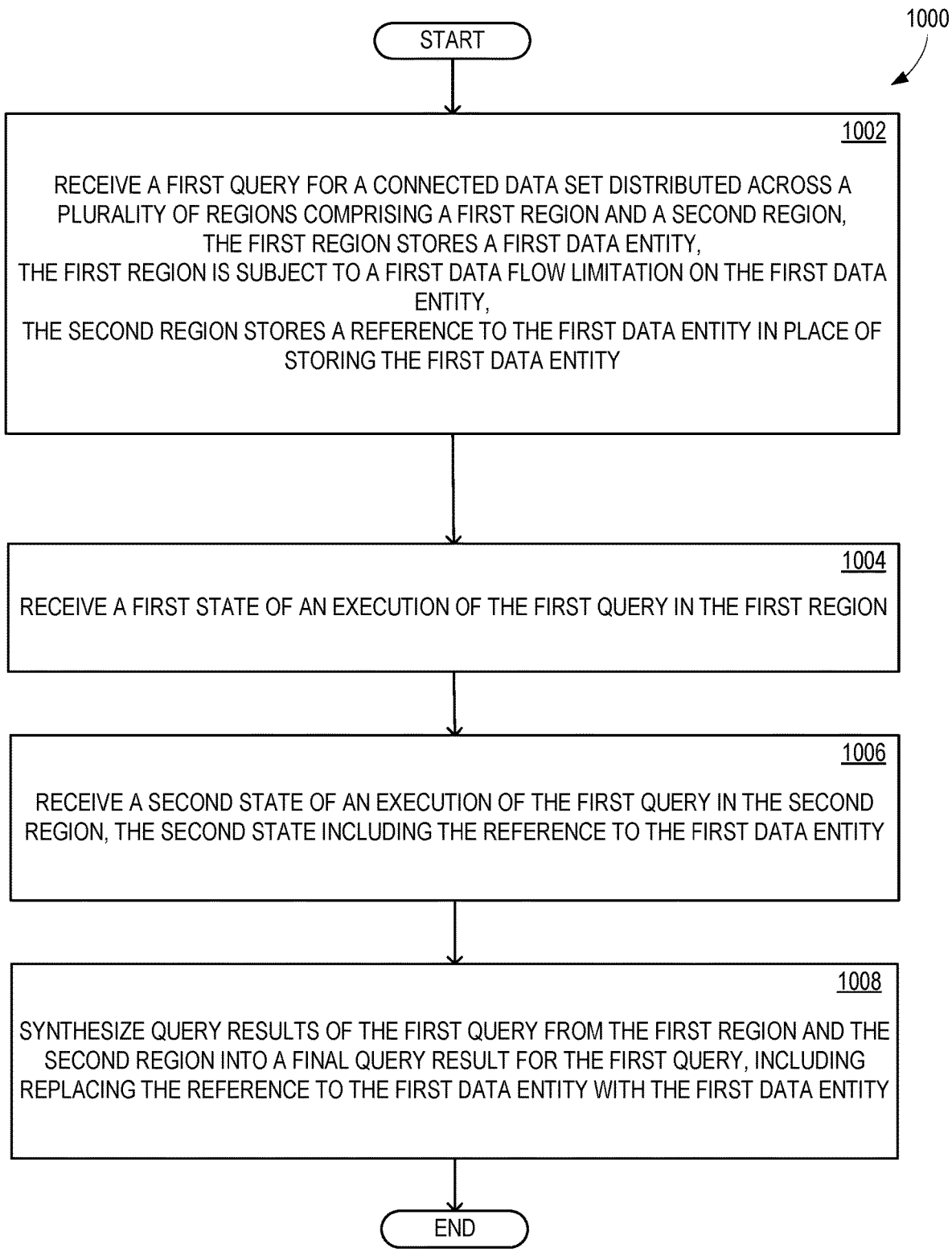
FIG. 10 shows a flowchart illustrating exemplary operations that may be performed using the architecture of FIG. 1.

FIG. 10 shows a flowchart 1000 illustrating exemplary operations associated with architecture 100. In some examples, operations described for flowchart 1000 are performed by computing device 1100 of FIG. 11. Flowchart 1000 commences with operation 1002, which includes receiving a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity.

Operation 1004 includes receiving a first state of an execution of the first query in the first region. Operation 1006 includes receiving a second state of an execution of the first query in the second region, wherein the second state includes the reference to the first data entity. Operation 1008 includes synthesizing query results of the first query from the first region and the second region into a final query result for the first query, wherein synthesizing the query results of the first query comprises replacing the reference to the first data entity with the first data entity.

ADDITIONAL EXAMPLES

An example system comprises: a processor; and a computer-readable medium storing instructions that are operative upon execution by the processor to: receive a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity; receive a first state of an execution of the first query in the first region; receive a second state of an execution of the first query in the second region, wherein the second state includes the reference to the first data entity; synthesize query results of the first query from the first region and the second region into a final query result for the first query, wherein synthesizing the query results of the first query comprises replacing the reference to the first data entity with the first data entity; and report the final query result for the first query.

An example computerized method comprises: receiving a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity; receiving a first state of an execution of the first query in the first region; receiving a second state of an execution of the first query in the second region, wherein the second state includes the reference to the first data entity; synthesizing query results of the first query from the first region and the second region into a final query result for the first query, wherein synthesizing the query results of the first query comprises replacing the reference to the first data entity with the first data entity; and reporting the final query result for the first query.

One or more example computer storage devices has computer-executable instructions stored thereon, which, on execution by a computer, cause the computer to perform operations comprising: receiving a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity; receiving a first state of an execution of the first query in the first region; receiving a second state of an execution of the first query in the second region, wherein the second state includes the reference to the first data entity; synthesizing query results of the first query from the first region and the second region into a final query result for the first query, wherein synthesizing the query results of the first query comprises replacing the reference to the first data entity with the first data entity; and reporting the final query result for the first query.

Alternatively, or in addition to the other examples described herein, examples include any combination of the following:

- injecting, into the first query, at least a portion of the first state;
- transmitting the first query, with the portion of the first state, to the second region;
- synthesizing query results of the first query from the first region and the second region comprises merging the first state with the second state;
- injecting, into the first query, at least a portion of the second state;
- transmitting the first query, with the portion of the second state, to the first region;
- receiving a third state of an execution of the first query in the first region;
- the data set comprises a property graph;
- the data set comprises a relational database;
- the plurality of regions comprises a plurality of data storage devices separated into different geographic locations;
- the plurality of regions comprises a plurality of data storage allocations in a common geographic location, separated by different tenant accounts;
- receiving a second query for the data set;
- determining that the first region is subject to a second data flow limitation on a second data entity;
- the first region stores the second data entity;
- the second region does not store either the second data entity or a reference to the second data entity;
- merging query results of the second query from the first region and the second region into a first intermediate query result;
- determining that no new data entities are discovered in the first intermediate query result, relative to a prior intermediate query result;
- based on at least determining that no new data entities are discovered in the first intermediate query result, synthesizing query results of the second query from the first region and the second region into a final query result for the second query;
- reporting the final query result for the second query.
- receiving a third query for the data set;
- determining that the first region is subject to a third data flow limitation on a third data entity;
- the first region stores the third data entity;
- the second region does not store either the third data entity or a reference to the third data entity;
- the third region does not store either the third data entity or a reference to the third data entity;
- determining whether an indication exists within the first region that no data entities outside the first region are related to any data entity reported in query results of the third query;
- based on at least determining that an indication exists within the first region that no data entities outside the first region are related, executing the third query within the first region and not executing the third query within the second region or the third region;
- determining whether an indication exists within the first region that a data entity within the second region is related to a data entity reported in query results of the third query;
- based on at least determining that an indication exists within the first region that a data entity within the second region is related, executing the third query within the first region and within the second region;
- determining whether an indication exists within the first region that a data entity within an unspecified region outside the first region is related to a data entity reported in query results of the third query;
- based on at least determining that an indication exists within the first region that a data entity within an unspecified region outside the first region is related, executing the third query within the first region, within the second region, and within the third region;
- receiving a fourth query for the data set;
- determining, with an ML component, a starting region of the plurality of regions in which to start the fourth query;
- transmitting the fourth query to the starting region;
- executing the fourth query within the starting region;
- the plurality of regions comprises a plurality of data storage devices separated into different geographic locations;
- the plurality of regions comprises a plurality of data storage allocations in a common geographic location, separated by different tenant accounts;
- the reference to the first data entity comprises a pseudonymous reference to the first data entity;
- determining whether the first region is subject to the first data flow limitation;
- determining whether the first region is subject to the second data flow limitation;
- determining whether the first region is subject to the third data flow limitation;
- transmitting the first query to the first region;
- executing the first query within the first region;
- transmitting the first query to the second region;
- executing the first query within the second region;
- transmitting the second query to the first region;
- executing the second query within the first region;
- transmitting the second query to the second region;
- executing the second query within the second region;
- transmitting the third query to the first region;
- executing the third query within the first region;
- transmitting the third query to the second region;
- executing the third query within the second region;
- transmitting the third query to the third region;
- executing the third query within the third region;
- executing queries within the second region and within the third region in parallel;
- determining the starting region comprises determining the starting region based on at least one aspect of the query selected from the list consisting of: a characteristic of a user performing the fourth query; a characteristic of a data owner of the data set; a characteristic of the data set; and a characteristic of the fourth query;

synthesizing query results from all regions of the plurality of regions that return data entities or references to data entities;

iteratively executing a query until completion criteria is satisfied;

performing the query using a central query manager;

performing the query as a peer-to-peer operation among the regions of the plurality of regions; and the first region is subject to a fourth data flow limitation on a relationship of the first data entity.

While the aspects of the disclosure have been described in terms of various examples with their associated operations, a person skilled in the art would appreciate that a combination of operations from any number of different examples is also within scope of the aspects of the disclosure.

Example Operating Environment

Figure 11:
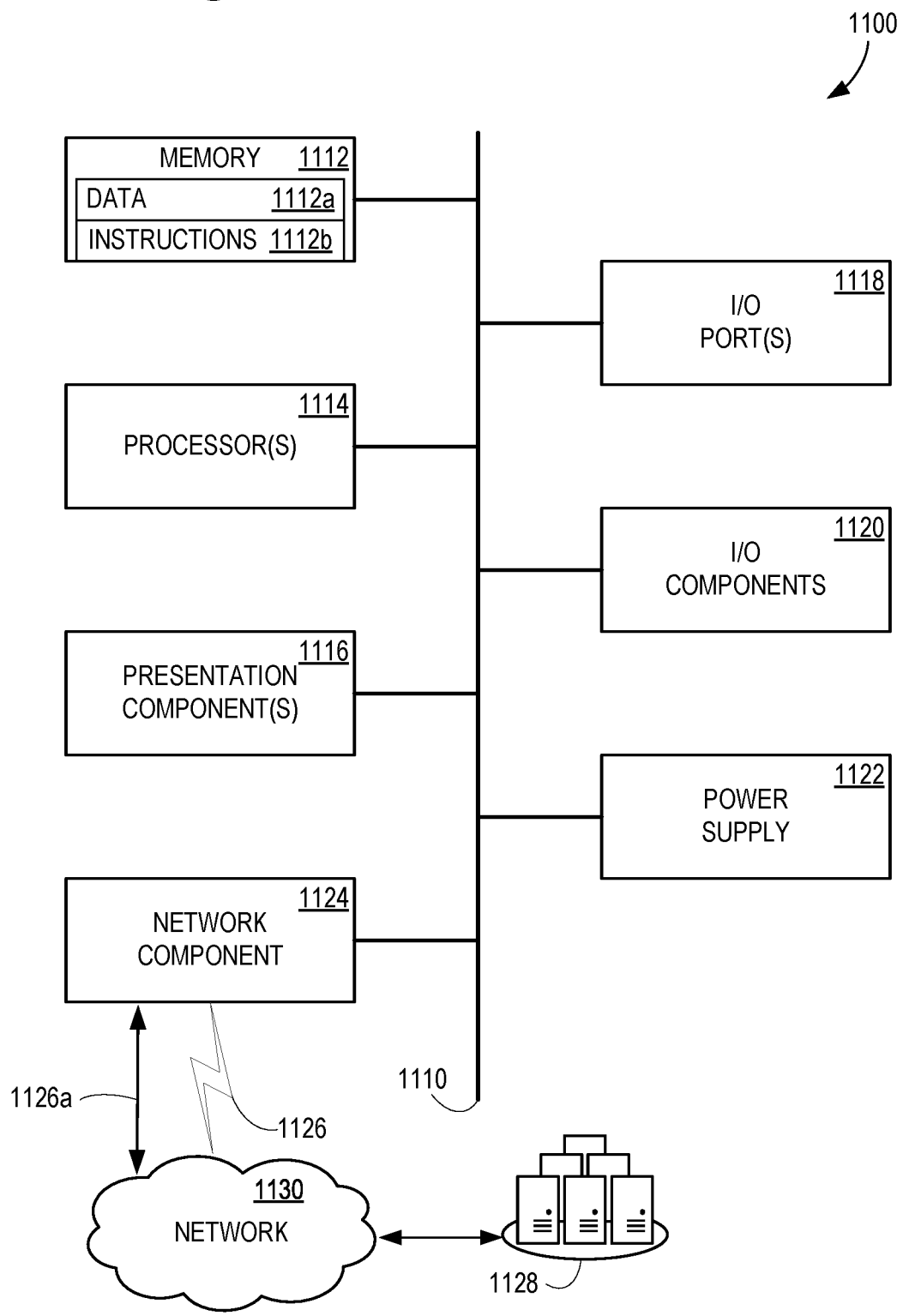
FIG. 11 shows a block diagram of an example computing environment suitable for implementing some of the various examples disclosed herein.

FIG. 11 is a block diagram of an example computing device 1100 for implementing aspects disclosed herein, and is designated generally as computing device 1100. In some examples, one or more computing devices 1100 are provided for an on-premises computing solution. In some examples, one or more computing devices 1100 are provided as a cloud computing solution. In some examples, a combination of on-premises and cloud computing solutions are used. Computing device 1100 is but one example of a suitable computing environment and is not intended to suggest any limitation as to the scope of use or functionality of the examples disclosed herein, whether used singly or as part of a larger set.

Neither should computing device 1100 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1100 includes a bus 1110 that directly or indirectly couples the following devices: computer storage memory 1112, one or more processors 1114, one or more presentation components 1116, input/output (I/O) ports 1118, I/O components 1120, a power supply 1122, and a network component 1124. While computing device 1100 is depicted as a seemingly single device, multiple computing devices 1100 may work together and share the depicted device resources. For example, memory 1112 may be distributed across multiple devices, and processor(s) 1114 may be housed with different devices.

Bus 1110 represents what may be one or more busses (such as an address bus, data bus, or a combination thereof). Although the various blocks of FIG. 11 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 11 and the references herein to a "computing device." Memory 1112 may take the form of the computer storage media referenced below and operatively provide storage of computer-readable instructions, data structures, program modules and other data for the computing device 1100. In some examples, memory 1112 stores one or more of an operating system, a universal application platform, or other program modules and program data. Memory 1112 is thus able to store and access data 1112a and instructions 1112b that are executable by processor 1114 and configured to carry out the various operations disclosed herein.

In some examples, memory 1112 includes computer storage media. Memory 1112 may include any quantity of memory associated with or accessible by the computing device 1100. Memory 1112 may be internal to the computing device 1100 (as shown in FIG. 11), external to the computing device 1100 (not shown), or both (not shown). Additionally, or alternatively, the memory 1112 may be distributed across multiple computing devices 1100, for example, in a virtualized environment in which instruction processing is carried out on multiple computing devices 1100. For the purposes of this disclosure, "computer storage media," "computer-storage memory," "memory," and "memory devices" are synonymous terms for the computer-storage memory 1112, and none of these terms include carrier waves or propagating signaling.

Processor(s) 1114 may include any quantity of processing units that read data from various entities, such as memory 1112 or I/O components 1120. Specifically, processor(s) 1114 are programmed to execute computer-executable instructions for implementing aspects of the disclosure. The instructions may be performed by the processor, by multiple processors within the computing device 1100, or by a processor external to the client computing device 1100. In some examples, the processor(s) 1114 are programmed to execute instructions such as those illustrated in the flow charts discussed below and depicted in the accompanying drawings. Moreover, in some examples, the processor(s) 1114 represent an implementation of analog techniques to perform the operations described herein. For example, the operations may be performed by an analog client computing device 1100 and/or a digital client computing device 1100. Presentation component(s) 1116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1100, across a wired connection, or in other ways. I/O ports 1118 allow computing device 1100 to be logically coupled to other devices including I/O components 1120, some of which may be built in. Example I/O components 1120 include, for example but without limitation, a microphone, joystick, game pad, satellite dish, scanner, printer, wireless device, etc.

Computing device 1100 may operate in a networked environment via the network component 1124 using logical connections to one or more remote computers. In some examples, the network component 1124 includes a network interface card and/or computer-executable instructions (e.g., a driver) for operating the network interface card. Communication between the computing device 1100 and other devices may occur using any protocol or mechanism over any wired or wireless connection. In some examples, network component 1124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1124 communicates over wireless communication link 1126 and/or a wired communication link 1126a to a remote resource 1128 (e.g., a cloud resource) across network 1130. Various different examples of communication links 1126 and 1126a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a computer-readable medium storing instructions that are operative upon execution by the processor to:
     receive a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity;
     receive a first state of an execution of the first query in the first region;

receive a second state of an execution of the first query in the second region, wherein the second state includes the reference to the first data entity;

merge the first state and the second state with the first query to produce a merged query;

execute the merged query in the first region to obtain a third state;

synthesize a final query result for the first query using of the first state, the second state, and the third state, wherein the reference to the first data entity is replaced by the first data entity in the final query result; and report the final query result for the first query.

2. The system of claim 1, wherein the instructions are further operative to:

inject, into the first query, at least a portion of the first state; and transmit the first query, with the portion of the first state, to the second region.

3. The system of claim 1, wherein synthesizing query results of the first query from the first state, the second state and the third state comprises merging the first state with the second state; and wherein the instructions are further operative to:
inject, into the first query, at least a portion of the second state;
transmit the first query, with the portion of the second state, to the first region; and
receive the third state of an execution of the first query in the first region.

4. The system of claim 1,
wherein the data set comprises a property graph; and
wherein the plurality of regions comprises a plurality of data storage devices separated into different geographic locations or a plurality of data storage allocations in a common geographic location, separated by different tenant accounts.

5. The system of claim 1, wherein the instructions are further operative to:

receive a second query for the data set;
determine that the first region is subject to a second data flow limitation on flow of a second data entity out of the first region, wherein the first region stores the second data entity, and wherein the second region does not store either the second data entity or a reference to the second data entity;
merge query results of the second query from the first region and the second region into a first intermediate query result;
determine that no new data entities are discovered in the first intermediate query result, relative to a prior intermediate query result;
based on at least determining that no new data entities are discovered in the first intermediate query result, synthesize query results of the second query from the first region and the second region into a final query result for the second query; and
report the final query result for the second query.

6. The system of claim 1, wherein the instructions are further operative to:
receive a third query for the data set;
determine that the first region is subject to a third data flow limitation on a third data entity, wherein the first region stores the third data entity, and wherein the second region does not store either the third data entity or a reference to the third data entity, and wherein a third region does not store either the third data entity or a reference to the third data entity;
determine that an indication exists within the first region that no data entities outside the first region are related to any data entity reported in query results of the third query;
based on at least determining that an indication exists within the first region that no data entities outside the first region are related, execute the third query within the first region and not executing the third query within the second region or the third region;
determine that an indication exists within the first region that a data entity within the second region is related to a data entity reported in query results of the third query;
based on at least determining that an indication exists within the first region that a data entity within the second region is related, execute the third query within the first region and within the second region;
determine that an indication exists within the first region that a data entity within an unspecified region outside the first region is related to a data entity reported in query results of the third query; and
based on at least determining that an indication exists within the first region that a data entity within an unspecified region outside the first region is related, execute the third query within the first region, within the second region, and within the third region.

7. The system of claim 1, wherein the instructions are further operative to:
receive a fourth query for the data set;
determine, with a machine learning component, a starting region of the plurality of regions in which to start the fourth query;
transmit the fourth query to the starting region; and
execute the fourth query within the starting region.

8. A computerized method comprising:
receiving a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity;
receiving a first state of an execution of the first query in the first region;
receiving a second state of an execution of the first query in the second region, wherein the second state includes the reference to the first data entity;
merging the first state and the second state with the first query to produce a merged query;
executing the merged query in the first region to obtain a third state;
synthesizing a final query result for the first query using the first state, the second, state and the third state, wherein the reference to the first data entity is replaced by the first data entity in the final query result; and
reporting the final query result for the first query.

9. The method of claim 8, further comprising:
injecting, into the first query, at least a portion of the first state; and
transmitting the first query, with the portion of the first state, to the second region.

10. The method of claim 8, wherein synthesizing query results of the first query from the first region and the second region comprises merging the first state with the second state; and
wherein the method further comprises:

injecting, into the first query, at least a portion of the second state;
transmitting the first query, with the portion of the second state, to the first region; and
receiving a third state of an execution of the first query in the first region.

11. The method of claim 8,
wherein the data set comprises a property graph; and
wherein the plurality of regions comprises a plurality of data storage devices separated into different geographic locations or a plurality of data storage allocations in a common geographic location, separated by different tenant accounts.

12. The method of claim 8, further comprising:
receiving a second query for the data set;
determining that the first region is subject to a second data flow limitation on a second data entity, wherein the first region stores the second data entity, and wherein the second region does not store either the second data entity or a reference to the second data entity;
merging query results of the second query from the first region and the second region into a first intermediate query result;
determining that no new data entities are discovered in the first intermediate query result, relative to a prior intermediate query result;
based on at least determining that no new data entities are discovered in the first intermediate query result, synthesizing query results of the second query from the first region and the second region into a final query result for the second query; and
reporting the final query result for the second query.

13. The method of claim 8, further comprising:
receiving a third query for the data set;
determining that the first region is subject to a third data flow limitation on a third data entity, wherein the first region stores the third data entity, and wherein the second region does not store either the third data entity or a reference to the third data entity, and wherein a third region does not store either the third data entity or a reference to the third data entity;
determining that an indication exists within the first region that no data entities outside the first region are related to any data entity reported in query results of the third query;
based on at least determining that an indication exists within the first region that no data entities outside the first region are related, executing the third query within the first region and not executing the third query within the second region or the third region;
determining that an indication exists within the first region that a data entity within the second region is related to a data entity reported in query results of the third query;
based on at least determining that an indication exists within the first region that a data entity within the second region is related, executing the third query within the first region and within the second region;
determining that an indication exists within the first region that a data entity within an unspecified region outside the first region is related to a data entity reported in query results of the third query; and
based on at least determining that an indication exists within the first region that a data entity within an unspecified region outside the first region is related, executing the third query within the first region, within the second region, and within the third region.

14. The method of claim 8, further comprising:
receiving a fourth query for the data set;
determining, with a machine learning component, a starting region of the plurality of regions in which to start the fourth query;
transmitting the fourth query to the starting region; and
executing the fourth query within the starting region.

15. One or more computer storage devices having computer-executable instructions stored thereon, which, on execution by a computer, cause the computer to perform operations comprising:
receiving a first query for a connected data set distributed across a plurality of regions comprising a first region and a second region, wherein the first region stores a first data entity, wherein the first region is subject to a first data flow limitation on the first data entity, and wherein the second region stores a reference to the first data entity in place of storing the first data entity;
receiving a first state of an execution of the first query in the first region;
receiving a second state of an execution of the first query in the second region, wherein the second state includes the reference to the first data entity;
merging the first state and the second state with the first query to produce a merged query;
executing the merged query in the first region to obtain a third state;
synthesizing a final query result for the first query using the first state, the second state, and the third state, wherein the reference to the first data entity replaced with by the first data entity in the final query result; and
reporting the final query result for the first query.

16. The one or more computer storage devices of claim 15, wherein the operations further comprise:
injecting, into the first query, at least a portion of the first state; and
transmitting the first query, with the portion of the first state, to the second region.

17. The one or more computer storage devices of claim 15, wherein synthesizing query results of the first query from the first region and the second region comprises merging the first state with the second state; and
wherein the operations further comprise:
injecting, into the first query, at least a portion of the second state;
transmitting the first query, with the portion of the second state, to the first region; and
receiving a third state of an execution of the first query in the first region.

18. The one or more computer storage devices of claim 15,
wherein the data set comprises a property graph; and
wherein the plurality of regions comprises a plurality of data storage devices separated into different geographic locations or a plurality of data storage allocations in a common geographic location, separated by different tenant accounts.

19. The one or more computer storage devices of claim 15, wherein the operations further comprise:
receiving a second query for the data set;
determining that the first region is subject to a second data flow limitation on a second data entity, wherein the first region stores the second data entity, and wherein the second region does not store either the second data entity or a reference to the second data entity;

merging query results of the second query from the first region and the second region into a first intermediate query result;

determining that no new data entities are discovered in the first intermediate query result, relative to a prior intermediate query result;

based on at least determining that no new data entities are discovered in the first intermediate query result, synthesizing query results of the second query from the first region and the second region into a final query result for the second query; and reporting the final query result for the second query.

20. The one or more computer storage devices of claim 15, wherein the operations further comprise:

receiving a third query for the data set;

determining that the first region is subject to a third data flow limitation on a third data entity, wherein the first region stores the third data entity, and wherein the second region does not store either the third data entity or a reference to the third data entity, and wherein a third region does not store either the third data entity or a reference to the third data entity;

determining that an indication exists within the first region that no data entities outside the first region are related to any data entity reported in query results of the third query;

based on at least determining that an indication exists within the first region that no data entities outside the first region are related, executing the third query within the first region and not executing the third query within the second region or the third region;

determining that an indication exists within the first region that a data entity within the second region is related to a data entity reported in query results of the third query;

based on at least determining that an indication exists within the first region that a data entity within the second region is related, executing the third query within the first region and within the second region;

determining that an indication exists within the first region that a data entity within an unspecified region outside the first region is related to a data entity reported in query results of the third query; and based on at least determining that an indication exists within the first region that a data entity within an unspecified region outside the first region is related, executing the third query within the first region, within the second region, and within the third region.

\* \* \* \* \*